(12) United States Patent
Lindenthal et al.

(10) Patent No.: US 6,540,617 B2
(45) Date of Patent: Apr. 1, 2003

(54) FLANGE YOKE FOR A UNIVERSAL JOINT AND A UNIVERSALLY JOINTED SHAFT

(75) Inventors: Hans Lindenthal, Heidenheim (DE); Hans Rösle, Heidenheim (DE); Peter Grawenhof, Dettingen (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/919,383

(22) Filed: Jul. 31, 2001

(65) Prior Publication Data

US 2002/0045487 A1 Apr. 18, 2002

(30) Foreign Application Priority Data

Aug. 1, 2000 (DE) .......................... 100 37 866

(51) Int. Cl.$^7$ ................................. F16D 3/40
(52) U.S. Cl. ........................ 464/135; 403/340
(58) Field of Search ......................... 464/134, 135, 464/136; 403/298, 339, 340, 344

(56) References Cited

U.S. PATENT DOCUMENTS

| | | | | |
|---|---|---|---|---|
| 561,166 A | * | 6/1896 | Herhold | 403/340 |
| 1,391,364 A | * | 9/1921 | Bulow | 403/340 |
| 4,637,807 A | | 1/1987 | Koelling, Sr. | |
| 6,056,644 A | * | 5/2000 | Lindenthal | 464/135 |

FOREIGN PATENT DOCUMENTS

| | | |
|---|---|---|
| DE | 4313141 | 9/1993 |
| DE | 931571 7.7 | 2/1994 |
| EP | 0206029 | 12/1986 |
| FR | 2708976 | 2/1995 |

OTHER PUBLICATIONS

European Search Report dated Jan. 23, 2001 for Application No. 01112014.4.

* cited by examiner

*Primary Examiner*—Greg Binda
(74) *Attorney, Agent, or Firm*—Ostrolenk, Faber, Gerb & Soffen, LLP (57) ABSTRACT

A flange yoke for a universal joint, two joint fork halves, each comprising a base component and a bearing component. The joint fork halves can be connected in a form-locking manner to one another in the region of their base component to form a flange. The base components have mutually complementary toothing in the region of the outer circumference on their coupling face, wherein the extension of a tooth trace of the toothing on the coupling face forms an angle of from >0 degrees to <180 degrees with a plane formed by the pin axis of a pin supported in a joint fork half and a joint fork axis coinciding with an axis of rotation of the joint fork. A second set of toothing is formed in the region of the joint fork axis on the mutually facing coupling faces of the base components. Extensions of these tooth traces are arranged at an angle of between 70 degrees and 110 degrees inclusive to the extension of a tooth trace of the first set of toothing.

22 Claims, 6 Drawing Sheets

FLANGE YOKE FOR A UNIVERSAL JOINT AND A UNIVERSALLY JOINTED SHAFT

BACKGROUND OF THE INVENTION

The invention relates to a flange yoke for a universal joint of a universally jointed shaft, comprising two joint fork halves and particularly relates to elements for causing the fork halves to act together under torque, and furthermore relates to a universally jointed shaft with a flange yoke.

A large number of embodiments of split flange yokes are known. Representative publications include:

1. EP 02 06 026 A1
2. DE 43 13 141 C2

Split joint forks make it possible to design one-piece dimensionally stable bearing lugs that, like joint forks that are not split, remain part of the adjoining fork arm via which power is transmitted to the bearing lug. This avoids interruption in the flow of power at those points on the joint fork that are subjected to the highest specific stresses. The dividing point, which is arranged in the plane of symmetry between the bearing lugs and the joint fork, lies in the region of low stress, which has no effect on power transmission. These arrangements have the advantages that the bearing arrangement is well embedded in the bearing lug, assembly is very easy and the bearing capacity of the bearing is increased. At the same time, split joint forks have considerable advantages for production, machining, transportation and storage.

In the embodiment described in EP 02 06 026 A1, each joint fork half has a flange, which has positive-locking elements on its side facing away from the axis of the spider. This forms a form-locking connection with the driven shaft or the shaft to be driven. In addition, releasable connections are provided between the flange and the respective shaft, by means of reduced-shank bolts, for example. The parting faces of the joint fork halves are arranged essentially parallel to one another, and they have mutually opposite keyseats in the central area. Square keys are inserted into these keyseats. These primarily prevent displacement of the individual joint fork halves relative to one another parallel to the pin axis of the respective pin supported in the joint fork. It is not possible to avoid relative motion of the joint fork halves perpendicular to the pin axis with this arrangement, nor can the joint fork halves be preloaded relative to one another. This permits undesirable lifting off of individual areas of the joint fork halves under the effect of the peripheral force, especially in reversing mode. Lifting off also has the effect of motion of the form-locking elements relative to the recesses on the adjoining shaft, which in turn leads to the formation of cavities, in which moisture and infiltrating surface water can collect. Corrosion phenomena result, which are accelerated by the micromovements of the joint fork halves.

To solve this problem, DE 43 13 141 C2 proposes an embodiment with end serrations on the underside of the flange and toothing in the region of the parting faces to provide a form-locking connection between the two joint fork halves. The toothing is preferably embodied as straight spur toothing with oblique flanks and is configured such that the extension of the tooth trace of the toothing or, where curved toothing is selected, of the secant through both end points of the tooth trace, forms an angle of from >0 degrees to <180 degrees with a plane formed by the joint fork axis and the pin axis. The joint fork axis generally lies in the plane of symmetry between the two joint fork halves and is perpendicular to the pin axis of the pin supported in this joint fork. The term joint fork axis is here understood to mean the axis of rotation, which coincides with the axis of rotation of a universally jointed shaft. The preloading of the flanks virtually eliminates relative motion between the joint fork halves perpendicular to the pin axis. However, small cracks have been observed at the roots of the teeth in this embodiment after a prolonged period of operation. This damage occurs to a particularly great extent especially in embodiments of flange yokes having a closed fork lug, i.e. an integral blind hole to receive the bearing arrangement for the spider.

SUMMARY OF THE INVENTION

The invention therefore has the object of developing a flange yoke of the type stated above such that relative motion of the joint fork halves parallel to the joint fork axis is virtually eliminated, while avoiding damage to the individual elements of the flange yoke, particularly on the joint fork halves. The flange yoke should furthermore have a favorable configuration for the reception of the bearing arrangement and for achieving bearing forces which are as high as possible and should be economically producible, involving effective use of existing capacity and should be easy to assemble.

In the first embodiment, the flange yoke comprises two joint fork halves, which are complementary to one another and which abut one another along a coupling face that is essentially perpendicular to the pin axis of a spider pin supported by the joint fork. The phrase joint fork halves complementary to one another is to be understood to mean that they can cooperate with one another to form a complete structural unit, consisting of the joint fork, which performs the function of coupling to shafting as a flange yoke. Each joint fork half comprises a base component connectable to a shaft, for example, and a bearing component. Both joint fork halves can be connected in a form-locking manner to one another in the region of their base component to form one flange component from the individual base components.

The base components of the joint fork halves have mutually complementary first sets of toothing in the region of the outer circumferences on their coupling face, so that each coupling face faces the base component of the other joint fork half. The extension of a tooth trace (or direction of extension) of the toothing on the coupling face or of a plurality of tooth traces, or when the toothing is in the form of curved toothing, the extension of the secant through the end points of a tooth trace or the extensions of a multiplicity of secants, form an angle of from >0 degrees to <180 degrees with a plane which is formed by the pin axis of the pin support ed in a joint fork half and by a joint fork axis coinciding with an axis of rotation of the joint fork. This first set of toothing is accordingly aligned in such a way that it can assume any position relative to the joint fork axis, with the exception, however, of a position parallel to the joint fork axis. Essentially, a distinction can be drawn between two cases:

1) The tooth traces of the toothing or their extension or, in the case of an embodiment with curved toothing, the secants through the end points of the tooth traces or their extensions, extend obliquely to a plane formed by the joint fork axis and a pin axis of a pin supported in the joint fork.
2) The tooth traces of the toothing or their extension or, in the case of embodiment as curved toothing, the secants through the end points of the tooth traces or their extensions, are parallel to this plane formed by the joint fork axis and the pin axis of the pin supported in the joint fork but, here too, parallel alignment of the first set of toothing to the joint fork axis is excepted.

In both cases, the tooth trace or its extension or the tangents intersect the joint fork axis once when the tooth traces or the tangents to the tooth traces and the joint fork axis are projected onto a common plane.

According to the invention, the first set of toothing is arranged only in that area of the coupling face that is radially toward the outside relative to the joint fork axis.

A further, second set of toothing is additionally provided in the more highly stressed regions of the joint fork halves. In this toothing, the fact that the extensions of one or more tooth traces of the second set of toothing or, in the case of an embodiment with curved toothing, the extensions of a secant through the end points of a tooth trace of the second set of toothing, are arranged at an angle of between 70 degrees and 110 degrees inclusive to the extension of a tooth trace of the first set of toothing or, in the case of curved toothing, to the extension of a secant through the end points of a tooth trace of the first set of toothing. The extensions of the tooth traces of the second set of toothing or, in the case of curved toothing, of the secants through the end points of the tooth trace, are preferably aligned essentially perpendicular to the tooth traces of the first set of toothing or the secants.

Means for clamping the two joint fork halves relative to one another are furthermore provided.

The provision of two sets of toothing aligned at an angle to one another on the coupling face of the two joint fork halves creates a form-locking connection between the joint fork halves which is self-centering in the axial direction in the installed position in shafting, in particular a universally jointed shaft. By means of the toothing, even very high forces can be compensated for without damage to the individual sets of toothing. This makes virtually impossible any movement essentially parallel to a plane formed by the joint fork axis and the pin axis of the other pin of a spider, which pin axis is aligned perpendicular to the pin axis of the pin supported in the joint fork. By virtue of the preloading of the flanks of the toothing, relative motion between the joint fork halves perpendicular to the pin axis, i.e. in the direction of the joint fork axis, is prevented. By virtue of the form-locking connection at the coupling faces of the joint fork halves, the opposing tensile and compressive stresses in one half of the connecting component are balanced in the connecting component, i.e. uniform load distribution is achieved over the entire cross section of the connecting component. Micromovements in the coupling between the connecting component and the flange yoke in the connection to the adjoining shaft are avoided. This avoids the formation of cavities in which infiltrating surface water and the like could accumulate. The additional mechanical stresses caused by relative motion, which could lead to acceleration of the corrosive effect at the points of contact, are thus likewise eliminated.

The first set of toothing can be embodied as spur toothing or curved toothing, for example. This applies analogously also to the second set of toothing. The second set of toothing is preferably embodied as straight spur toothing with a flank angle of between 10 and 60 degrees inclusive.

As regards the design of the second set of toothing on the coupling faces, toothing with a pitch in a range of from 8 to 20 inclusive in relation to the diameter of rotation of shafting coupled to the flange yoke of between 500 and 1000 cm inclusive is preferable to obtain the best possible load bearing pattern.

The two joint fork halves are preferably of essentially symmetrical construction. In that case, the coupling face of each joint fork half can be described by a plane. However, there is also the possibility of an asymmetric configuration of the base components of the two joint fork halves, i.e. the coupling face comprises partial areas that are arranged in different planes. In this case, one of the two joint fork halves can have a recess, for example, while the other joint fork half has the projection complementary to the recess, thereby precisely defining the position of the two joint fork halves relative to one another. The sets of toothing can then be arranged in the areas of the coupling face that are formed by the projections and recesses.

The means for force- and/or form-locking connection provided on the underside of the flange, which side faces away from the pin axis, for the purpose of torque transmission and centering, cooperating with means embodied in a manner complementary to them on the connection elements, which are preferably embodied as end serrations, the tooth traces of the serrations extending in a radial direction relative to the joint fork axis, and by virtue of additional screwed joints between the flange yoke and the connecting component, a self-centering and force-locking connection is additionally formed with the adjoining shaft or connecting component. This prevents movement of the joint fork halves relative to one another parallel to the pin axis of the pin supported in this joint fork or perpendicular to the joint fork axis.

The joint fork axis preferably lies in the plane of symmetry between the two joint fork halves and is perpendicular to the pin axis of the pin supported in the joint fork. The symmetry of the two joint fork halves is easy to achieve in terms of production, but is not compulsory.

The toothing is preferably embodied in such a way that, when projected onto one plane with the joint fork axis, the tooth traces or their extensions extend perpendicular to the joint fork axis and perpendicular to a plane formed by the joint fork axis and a pin axis of a pin supported in the joint fork. The size of the toothing on the parting faces will preferably be the same as that of the end serrations on the underside of the flange yoke. This provides the possibility of making more effective use of tools which are already available.

The second possibility for achieving the invention comprises cutting out a segment in those areas of the base components that are subject to little stress, before dividing the flange yoke, and providing a corresponding first set of toothing on the mutually complementary parting faces of the segment and the joint fork halves, as already described. The arrangement of the second set of toothing is produced in an analogous manner.

Other objects and feature of the invention are explained below with reference to the drawings.

DESCRIPTION OF PREFERRED EMBODIMENTS

Figure 2:
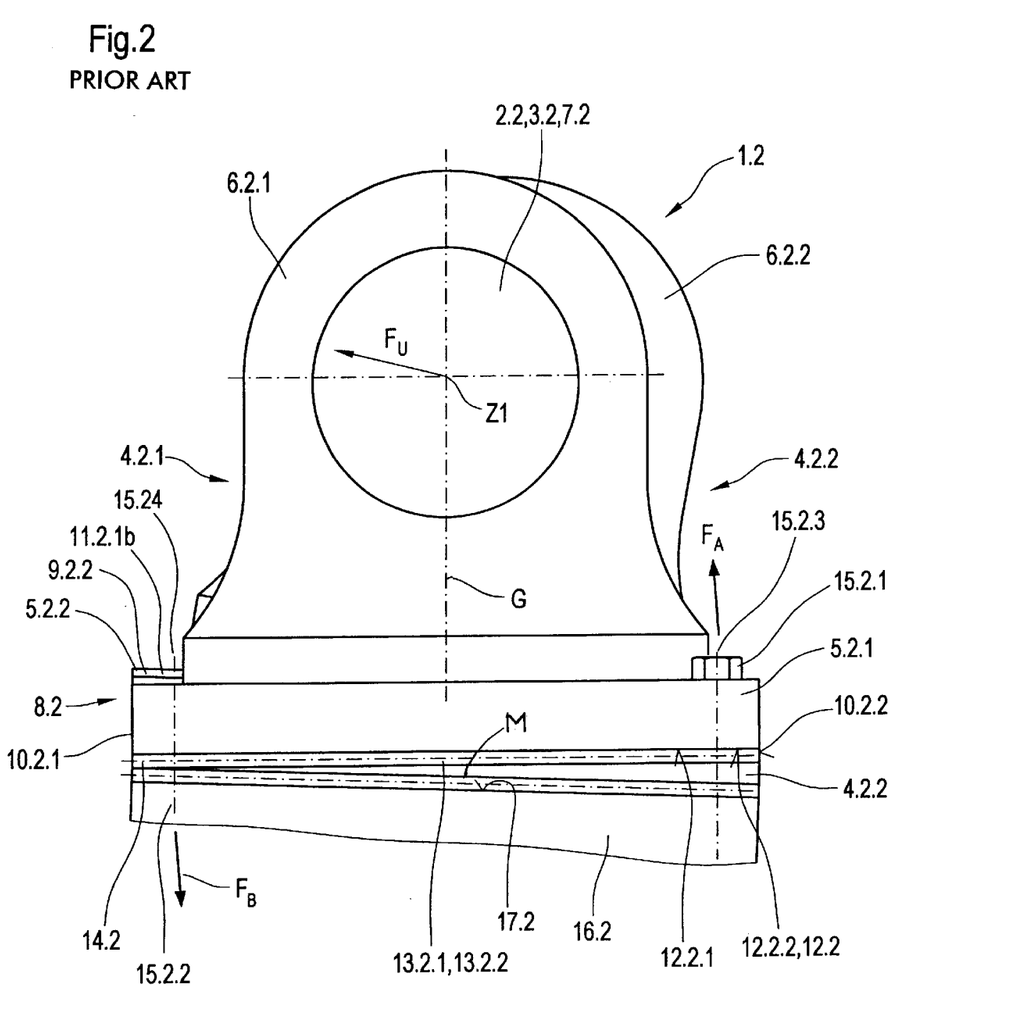
FIG. 2 shows the effect of the peripheral force on the joint fork halves (not shown to scale and greatly exaggerated for the purpose of clarity) of a joint fork according to the prior art in various views.

FIG. 2 is a front view of a flange yoke 1.2 shown in the form of a joint fork (two halves together) in accordance with the prior art. It illustrates, in a greatly exaggerated form, the effect of the peripheral force $F_u$ that acts on the two joint fork halves 4.2.1 and 4.2.2 of the flange yoke during the transmission of a torque at the pins 2.2 and 3.2 supported in the flange yoke 1.2. Each joint fork half 4.2.1 and 4.2.2 comprises a base component 5.2.1 and 5.2.2 respectively and a bearing component 6.2.1 and 6.2.2 respectively to support the pins 2.2 and 3.2 of a spider 7.2. The two joint fork halves 4.2.1 and 4.2.2 are connected to one another in a form-locking manner in the region of their base components to form a flange component 8.2. The form locking is achieved by appropriate configuration of the mutually facing coupling faces 9.2.1 and 9.2.2, shown only in part here, on the base components 5.2.1 and 5.2.2. For this purpose, the individual base components, 5.2.1 of the first joint fork half 4.2.1 and 5.2.2 of the second joint fork half 4.2.2, have mutually complementary toothing comprising the component toothing 11.2.1b and 25 11.2.1a (not shown here) and 11.2.2a and 11.2.2b, respectively, on their coupling faces 9.2.2 and 9.2.1 each toothing facing the toothing on the base component of the other joint fork half 4.2.2 or 4.2.1, in the region of their respective outer circumferences 10.2.1 and 10.2.2. The toothing 11.2.1 a and 11.2.1b and the complementary toothing 11.2.2a and 11.2.2b each extend from the outer circumference 10.2.1 or 10.2.2 of the individual joint fork half toward the joint fork axis (G), which is understood to be the axis of rotation of the flange yoke 1.2. The toothing extends over a partial area of the coupling faces 9.2.1 and 9.2.2 respectively. When designed as spur toothing, the toothing 11.2.1a, 11.2.1b, 11.2.2a and 11.2.2b is embodied in such a way t extension of a tooth trace (the direction of extension) of the toothing or, where it is designed as curved toothing, the extension of the secant through the end points of the tooth trace of a toothing element of the toothing, includes an angle of greater than 0 degrees to less than 180 degrees with a plane formed by the pin axis Z1 of the pin 2.2, which is supported in a joint fork half 4.2.1, and a joint fork axis (G) coinciding with an axis of rotation of the flange yoke 1.2. (That plane is vertical in the Figures hereof.)

At the ends 12.2.1 and 12.2.2, respectively, remote from the bearing components 6.2.1 and 6.2.2 respectively, the flange yoke 1.2, in particular the two joint fork halves 4.2.1 and 4.2.2, have means 13.2.1 and 13.2.2, respectively, for implementing form- and/or force-locking connection for the purpose of achieving torque transmission and centering of the flange yoke 1.2 in the connecting plane with a connection element, which in particular is in the form of shafting 16.2. The means comprise axially aligned end serrations 14.2 arranged to extend radially and arrayed around the underside of the flange on the ends 12.2.1 and 12.2.2, respectively, remote from the bearing components 6.2.1 and 6.2.2 to form the overall end 12.2 of the flange yoke 1.2. Here, the term end serrations is understood to refer to toothing where the geometrical lines of the extension from individual toothing elements meet at a common point M. The height of the toothing varies, as seen from the center M, which lies on the joint fork axis G, to the outer circumferences 10.2.1 and 10.2.2, respectively, of the individual base components 5.2.1 and 5.2.2 of the flange yoke 1.2.

Fixing in the axial direction is accomplished by means of screwed joints 15.2, here 15.2.1, 15.2.2 and 15.2.3, 15.2.4 on the opposite joint fork half between the flange yoke 1.2 and the corresponding connection element in the form of shafting 16.2.

Arranged at the end 17.2 of the shafting 16.2 facing the flange yoke 1.2, there are end serrations embodied in a manner complementary to the end serrations 14.2 on the ends 12.2.1 and 12.2.2 respectively of the flange yoke 1.2. The two mutually complementary sets of end serrations 14.2 on the underside 12.2 of the flange of the flange yoke 1.2 and on that end 17.2 of the connection element in the form of shafting 16.2 that faces the flange yoke 1.2 form a self-centering joint given appropriate preloading by means of the screwed joints 15.2.

In conjunction with a deformation (not shown here) of the joint fork halves, a peripheral force $F_u$ acts on the joint fork due to the torque to be transmitted. This has the effect of applying a corresponding force on the flanks of the sets of toothing 11.2.1a, 11.2.1b and 11.2.2a, 11.2.2b, which may lead to damage and galling in the region of individual toothing elements of the sets of toothing if the force is high enough. The peripheral force Fu furthermore leads to forces applied in different directions that act on the individual screwed joints 15.2.1, 15.2.2, 15.2.3, 15.2.4 and cause differences in the stresses on the joint between the flange yoke 1.2 and the connection element in the form of shafting 16.2. Relatively severe damage to the sets of toothing 11.2.1a, 11.2.1b and 11.2.2a, 11.2.2b can cause play between the two sets of toothing and cause relative micromovements between the sets of toothing on the underside of the flange, that is, on the end faces 12.2.1 and 12.2.2, respectively, of the base components 5.2.1 and 5.2.2 that face away from the bearing components 6.2.1 and 6.2.2 and are on the end 17.2 facing the flange yoke 1.2. These relative movements cause formation or enlargement of relatively small cavities between the flanks of the interengaging teeth, i.e. the individual toothing elements of the sets of toothing 11.2.1a, 11.2.1b and 11.2.2a, 11.2.2b, which are formed in a mutually complementary manner on the coupling faces 9.2.1 and 9.2.2 respectively, and the mutually complementary sets of toothing on the shafting 16.2 and the underside of the flange yoke 1.2, which are formed by the individual ends 12.2.1 and 12.2.2, respectively, of the base components 5.2.1 and 5.2.2 of the joint fork halves 4.2.1 and 4.2.2 to form the overall end face 12.2. There is a possibility that moisture and infiltrating surface water will accumulate in these cavities, which can lead to corrosion. The corrosive effect is additionally amplified by the movement at the points of contact between the individual sets of toothing.

In this example, the peripheral force Fu produces a torque M in joint fork half 4.2.1, which produces a force $F_A$ at the screwed joint 15.2.1 in the same direction as the preloading force of the bolts and produces a force $F_B$ at the screwed joint 15.2.2 in the opposite direction to the preloading force. The screwed joint 15.2.1 is subjected,to tensile stress. Here, the tensile force is added to the preloading force. At the same time, the connecting component is likewise subjected to stress in the region of the screwed joint. The screwed joint 15.2.2 is relieved of load since the force $F_B$ takes effect as a compressive force and acts in the opposite direction to the preloading force. In the region of the screwed joint 15.2.2, the connecting component, i.e. the shafting 16.2, and the end serrations present there, are subjected to compression. The toothing on the same side as the screwed joint 15.2.2 is relieved of load, i.e. this half of the joint fork half 4.2.1 acts as a passive side. The toothing in the region of the screwed joint 15.2.1 is subjected to load. For this reason, this side of the joint fork half 4.2.1 is referred to as the active side. The forces $F_A$ and $F_B$ on the opposing complementary joint fork halves 4.2.2 behave in a similar way. However, there is always tensile and reverse stress on the facing components of the joint fork halves.

If the mode of operation remains the same, i.e. there is no reversal of operation, there is no change between the passive and the active side. This means that the individual sides of the joint fork halves 4.2.1 and 4.2.2 are always subjected to the same stresses and hence, the same areas of the connecting component in the form of the shafting 16.2 are always subjected to tensile or compressive stresses. This likewise further increases the stresses on the sets of coupling teeth.

Figure 1A:
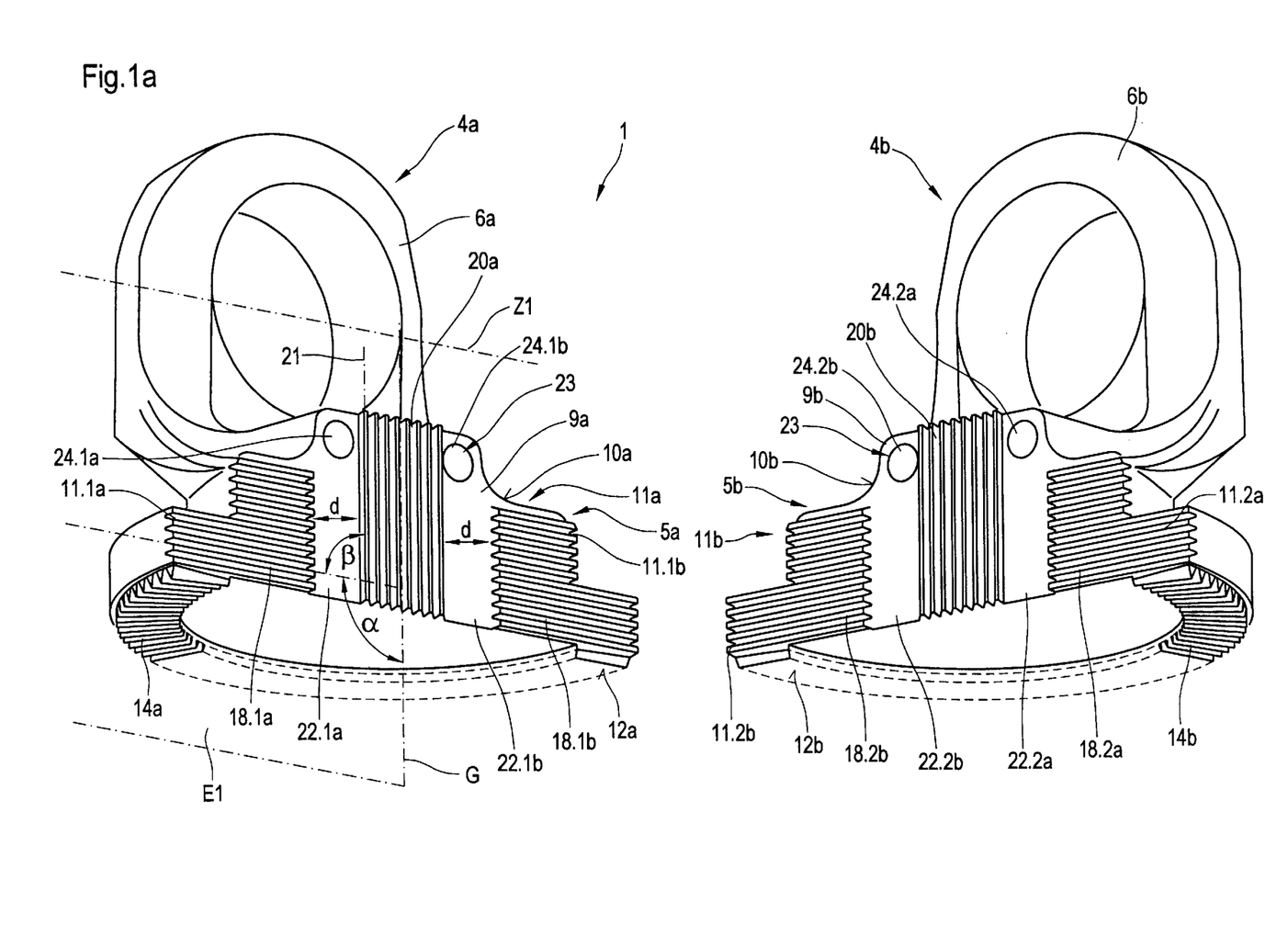
FIG. 1a shows an embodiment comprised of two joint fork halves of a flange yoke according to the invention with straight spur toothing, the fork halves being shown in opposing perspective views.

FIG. 1*a* illustrates in perspective view two joint fork halves 4*a* and 4*b*, which form a flange yoke 1 according to the invention. Each yoke half comprises a base component 5*a* and 5*b* and a bearing component 6*a* and 6*b* to receive the bearing arrangement of the spider pin supported in the joint fork or flange yoke formed on both joint fork halves 4*a* and 4*b*.

The base component 5*a* or 5*b* of the joint fork half 4*a* or 4*b* can be embodied in many different ways. Embodiments with a uniform transition between the bearing component 6*a* or 6*b* and the base component and embodiments of the base component 5*a* or 5*b* with invariable cross-sectional dimensions are conceivable. In the embodiment illustrated, the base component 5*a* or 5*b* is divided into zones of different cross-sectional dimensions. The zone with the largest dimension also forms the individual ends 12*a* and 12*b*, together forming the end 12. They face away from the respective bearing components and carry the end serrations 14*a* and 14*b* required for torque transmission.

Respective first sets of toothing 11*a* and 11*b* aligned in a manner complementary to the toothing on the other joint fork half 4*a* or 4*b* are arranged on the mutually facing coupling faces 9*a* and 9*b* in the region of the outer circumference 10*a* and 10*b* of the base components 5*a* and 5*b* respectively. These sets of toothing have two component sets of toothing 11.1*a*, 11.1*b* on one fork half and 11.2*a*, 11.2*b* on the other fork half, respectively. The individual component sets of toothing 11.1*a*, 11.1*b* and 11.2*a*, 11.2*b* respectively extend in the radial direction from the region of the outer circumference 10*a* and 10*b* of the base components 5*a* and 5*b* respectively in the direction of the joint fork axis G, which coincides in the installed position with the axis of rotation of the joint fork, that is of the flange yoke 1, over respective partial areas 18.1*a* and 18.1*b* of coupling face 9*a* and 18.2*a* and 18.2*b* of coupling face 9*b*. In the illustrated example, the individual sets of toothing 11.1*a*, 11.1*b*, 11.2*a* and 11.2*b* are embodied as straight spur toothing. The extended tooth traces of this toothing, in this case the tooth traces 19 representing the others, extend essentially perpendicular to a plane formed by the pin axis Z1 of the pin supported in the joint fork half, in this case the joint fork half 4*a*, and the joint fork axis G. An angular range for the angle α of >0 degrees to <180 degrees between the extension of the tooth trace 19 of a set of toothing and the plane El formed by the pin axis Z1 and the joint fork axis G is also conceivable, however. In an embodiment with curved toothing (not illustrated here), the alignment of the toothing can be described by the extension of the secant through the end points of the individual tooth trace. This likewise forms an angle of >0 degrees to <180 degrees with the plane E1 formed by the pin axis Z1 of the pin Z1 supported in the joint fork half 4*a* and a joint fork axis G that coincides with the axis of rotation of the joint fork, that is of the flange yoke 1.

According to the invention, second sets of toothing 20*a* and 20*b*, the tooth traces of which or the extension of the individual tooth traces of which, are here represented by tooth trace 21 as straight spur toothing, assume an angle β to the extension of the tooth trace 19 of one component set of toothing, here the first component set of toothing 11.1*a* of the first set of toothing, in a range between 70 and 110 degrees inclusive, while the tooth trace on the second set of component toothing, in this case 11.1*b*, assumes an angle of 110 degrees to 69 degrees. These toothings are provided on the coupling faces 9*a* and 9*b* in the region of the joint fork axis G or, where the joint fork axis G does not pass through the coupling faces 9*a* and 9*b*, i.e. in the case of parallel arrangement, between the joint fork axis G and at least a partial area of the coupling faces 9*a* and 9*b* when projected into a common plane. Perpendicular alignment of the tooth trace 21 of the toothing 20*a* and of the corresponding tooth trace of the toothing 20*b* to the tooth traces of toothing 11.2*b* and 11.2*a* respectively is preferably selected.

The toothing 20*a* and 20*b* is preferably arranged in the region of the joint fork axis G, i.e. in the central area of the coupling faces 9*a* and 9*b* respectively. The toothing can preferably extend into the end region of the sets of toothing 11.1*a* and 11.1*b* and, in the case of joint fork half 4*b*, 11.2*a* and 11.2*b*, which are preferably aligned perpendicular to it. However, a spacing d is preferably provided between the sets of toothing aligned at a certain angle to one another. In the embodiment in FIG. 1*a*, the selected spacing d on both sides between toothing 20*a* and the sets of toothing 11.1*a* and 11.1*b* arranged in the region of the outer circumference 10*a* of the base component 5*a* is preferably the same. Asymmetrical embodiments (not shown here) are also conceivable, however.

The intervening areas that can be described by the spacing d on the coupling faces 9*a* and 9*b* thus describe partial areas that are free of toothing, at 22.1*a* and 22.1*b* on joint fork half 4*a* and 22.2*a* and 22.2*b* on joint fork half 4*b*. Means 23 for clamping the two joint fork halves are preferably arranged in these areas. Clamping is generally accomplished by means of screwed joints or some other fastening elements that can be tightened. Through openings 24.1*a*, 24.1*b*, 24.2*a* and 24.2*b* are provided for this purpose in the corresponding joint fork halves 4*a* and 4*b*. The complementary designs of the individual sets of toothing 11.11*a*, 11.1*b* and 11.2*a*, 11.2*b* arranged in the outer region of the base components 5*a* and 5*b* respectively and of the further, second, sets of toothing 20*a* and 20*b*, respectively, arranged between these two component sets of toothing in the region of the joint fork axis allow a form-locking connection between the two joint fork halves 4*a* and 4*b* that prevents motion of the two joint fork halves 4*a* and 4*b* relative to one another parallel to a plane formed by the joint fork axis G and a perpendicular to the pin axis Z1 of the pins supported in the joint fork halves 4*a* and 4*b* respectively, which coincides with the pin axis of the pins arranged perpendicular to these pins. Even if the sets of toothing 11.1*a*, 11.1*b* and 11.2*a*, 11.2*b* in the outer region of the base components 5*a* and 5*b* respectively are damaged, the individual joint fork halves undergo self-centering since the form-locking engagement in the coupling plane is essentially in two directions. The clamping of the two joint fork halves 4*a* and 4*b* against one another, which is accomplished by appropriate means 23, which are embodied as fastening elements for example, is achieved in a very simple manner in the way described. The fastening elements can be clamping bolts or, alternatively, screwed joints. In the latter case, the through openings in one of the joint fork halves 4a or 4b must be provided with a corresponding thread. The specific embodiment of the means for clamping 23 will be at the discretion of the responsible person skilled in the art, as will their arrangement. However, they will preferably be arranged in the region of lowest stress on the overall flange yoke 1. This region corresponds to the region of the base components 5a and 5b respectively, which is essentially in the region of the joint fork axis G.

Figure 1B:
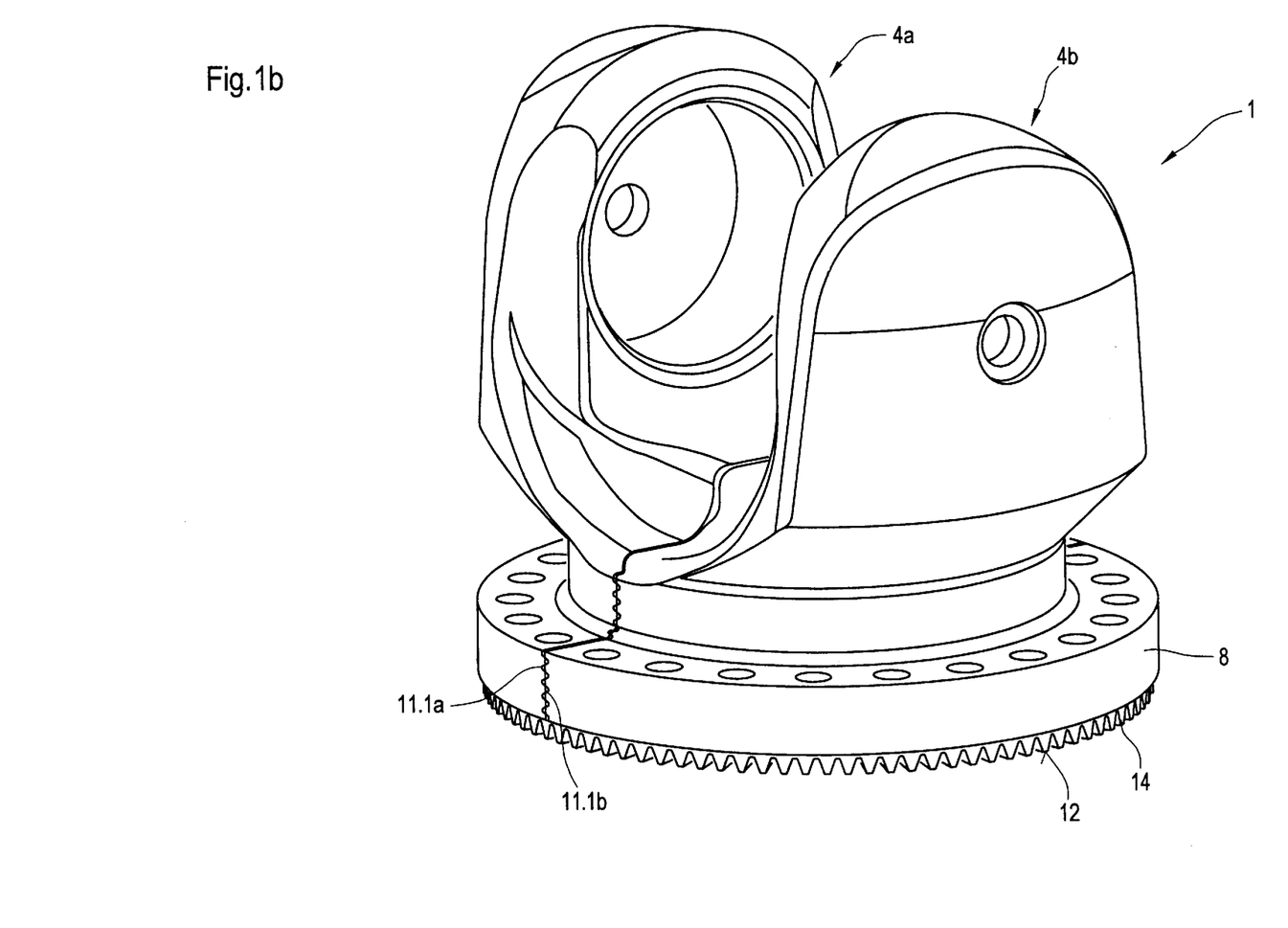
FIG. 1b shows an embodiment of a flange yoke assembled from two joint fork halves according to the invention.

FIG. 1b illustrates the flange yoke 1 according to the invention in an assembled condition, i.e. in the installed position, in a side view. It also shows the shafting 16 coupled to the flange yoke 1.

Figure 3:
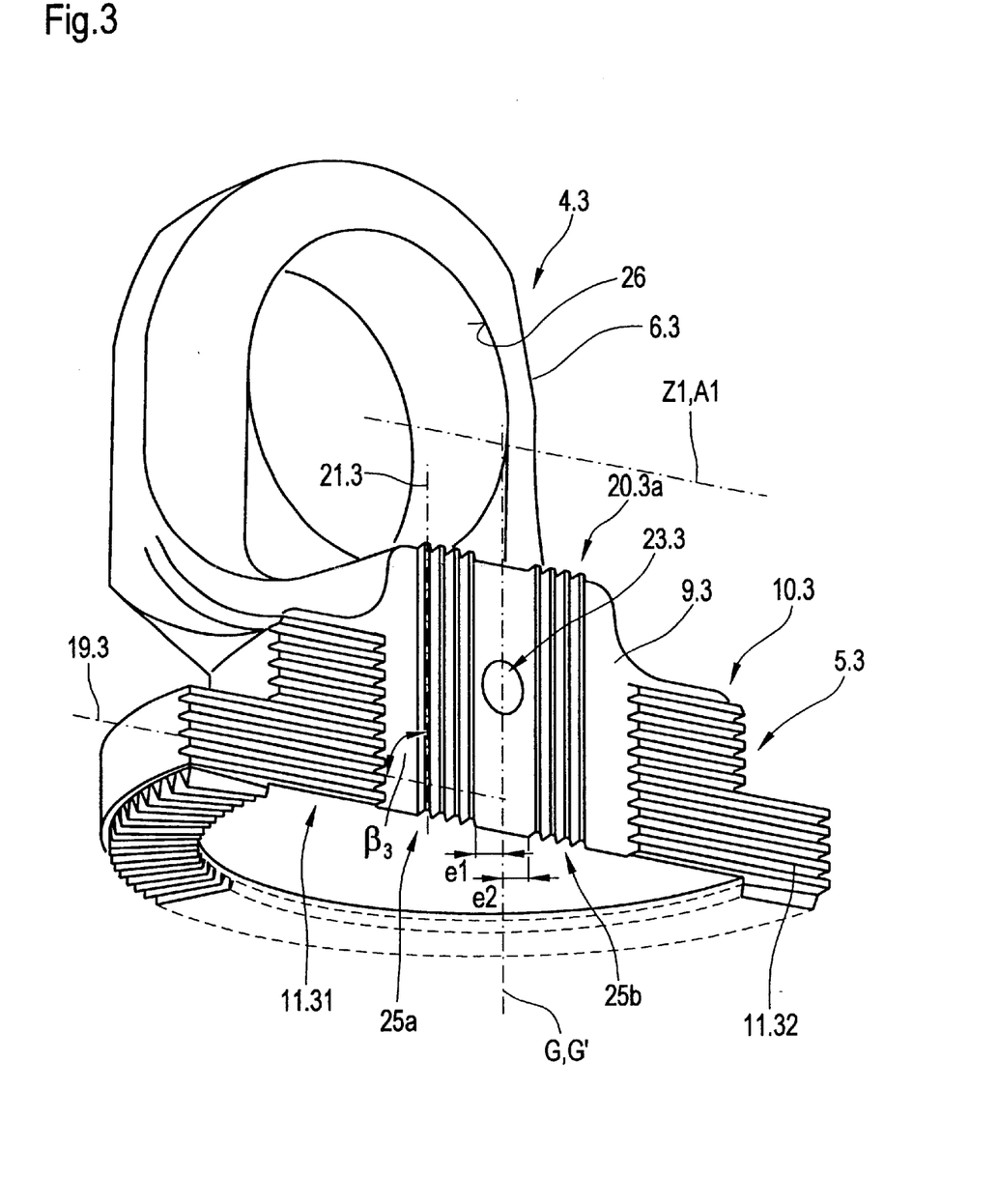
FIG. 3 is a perspective view showing a further embodiment of the invention of a joint fork half of a flange yoke.

FIG. 3 illustrates, by a perspective view of a joint fork half 4.3, another refinement of the embodiment of the second set of toothing on the coupling face 9.3 of the joint fork half 4.3. The basic structure of the joint fork half comprising bearing component 6.3 and base component 5.3 corresponds essentially to that described from FIG. 1a. For that reason, identical reference numerals are used for identical elements. The only difference in the numbering is for the present embodiment of the second set of toothing, which is here designated by 20.3a. The second set of toothing 20.3a is here divided into two component sets of toothing 25a and 25b. The two component sets of toothing are arranged on the coupling face 9.3 in the region of the joint axis G, in the case illustrated at a distance e1 and e2, respectively, from the joint axis G or, where the joint axis G is projected onto the coupling face 9.3, from the projected joint fork axis G'. Here too, there is a theoretical possibility that both component sets of toothing 25a and 25b will extend into the region of the first sets of toothing 11.3.1 and 11.3.2 respectively. However, an area that is free of toothing is preferable between the two sets of toothing in the radial direction, in the direction toward the joint fork axis G. This is advantageous, in particular, for the production of the individual toothing elements. Here too, means 23.3 for clamping between the joint fork half 4.3 illustrated and another joint fork half not illustrated here specifically, but embodied with complementary first and second sets of toothing on the coupling face are provided. For this purpose, the joint fork half 4.3 contains at least one through opening 23.3, which serves to guide clamping means. Here too, both sets of toothing, the first set of toothing 11.3.1, 11.3.2 and the second set of toothing 20.3a, are embodied as straight spur toothing. The tooth traces or extensions of the latter extend essentially perpendicular to one another. This is illustrated for one toothing element by a tooth trace 19.3 on the first component set of toothing 11.3.1 of the first set of toothing and by a tooth trace 21.3 on one toothing element of the second set of toothing 20.3a, in particular the first component set of toothing 25a of the second set of toothing 20.3a. The angle between the two tooth traces is indicated by β3. Here too, it is understood that the tooth traces of the first set of toothing extend in a range of from >0 to <180 degrees to a plane that passes through the joint fork axis and the pin axis Z1 of the pin supported in the joint fork, which coincides with the axis of the bearing hole 26. This means that the pin axis Z1 corresponds to the axis through the bearing hole A1.

Figure 4:
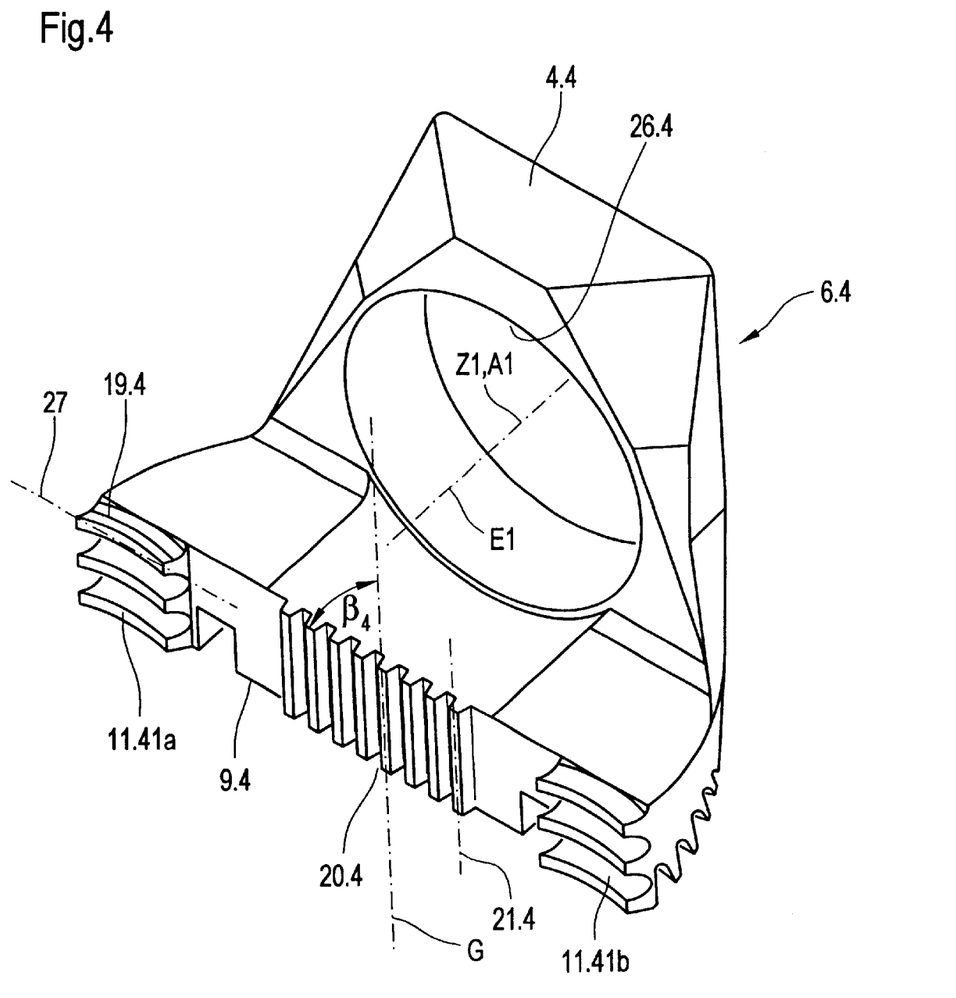
FIG. 4 is a perspective view showing another embodiment of a joint fork half with curved toothing on the coupling face in the region of the outer circumference of the base component.

FIG. 4 illustrates the structure of a required joint fork half 4.4 for another embodiment of a flange yoke according to the invention. The first set of toothing, here 11.4.1a and 11.4.1b, is in the form of curved toothing. The tooth trace for the first set of toothing is here represented by 19.4 on a toothing element. The angle for the shape and alignment of the curved toothing is indicated by the secant 27 to the tooth trace 19.4. It extends at an angle of β4=90 degrees to a plane E1 formed by the pin axis Z1 of the pin supported in the joint fork, which corresponds to the axis of the bearing hole A1, and the joint fork axis G. Here too, the bearing hole is indicated by 26.4 and the bearing component by 6.4. The joint fork half 4.4 illustrated in FIG. 4 has a second set of toothing 20.4 in the region of the joint fork axis G in the region of the coupling face 9.4. This is embodied as straight spur toothing, and the tooth traces 21.4 are aligned parallel to the joint fork axis G.

In the embodiments of the joint fork half that are illustrated in FIGS. 1, 3 and 4, the coupling face 9 can be described by a plane. This means that the first and the second set of toothing are each arranged on a surface. However, it is also possible to embody the base component of the two joint fork halves in a complementary manner where the coupling faces can be described by different planes. Specifically, the first component toothing is on projections on the first joint fork half and the second set of toothing is in a recess, while the joint fork half embodied in a complementary manner to it has its first set of toothing arranged in a plane that is set back relative to its second set of toothing. The second set of toothing on the second complementary joint fork half is arranged on a projection on the base component.

The embodiments illustrated in FIGS. 1 to 4 have sets of toothing having tooth traces which are arranged perpendicular to one another. Embodiments in which the tooth traces or secants through the tooth traces are arranged at an angle of between 70 and 110 degrees to one another are also conceivable.

Figure 5:
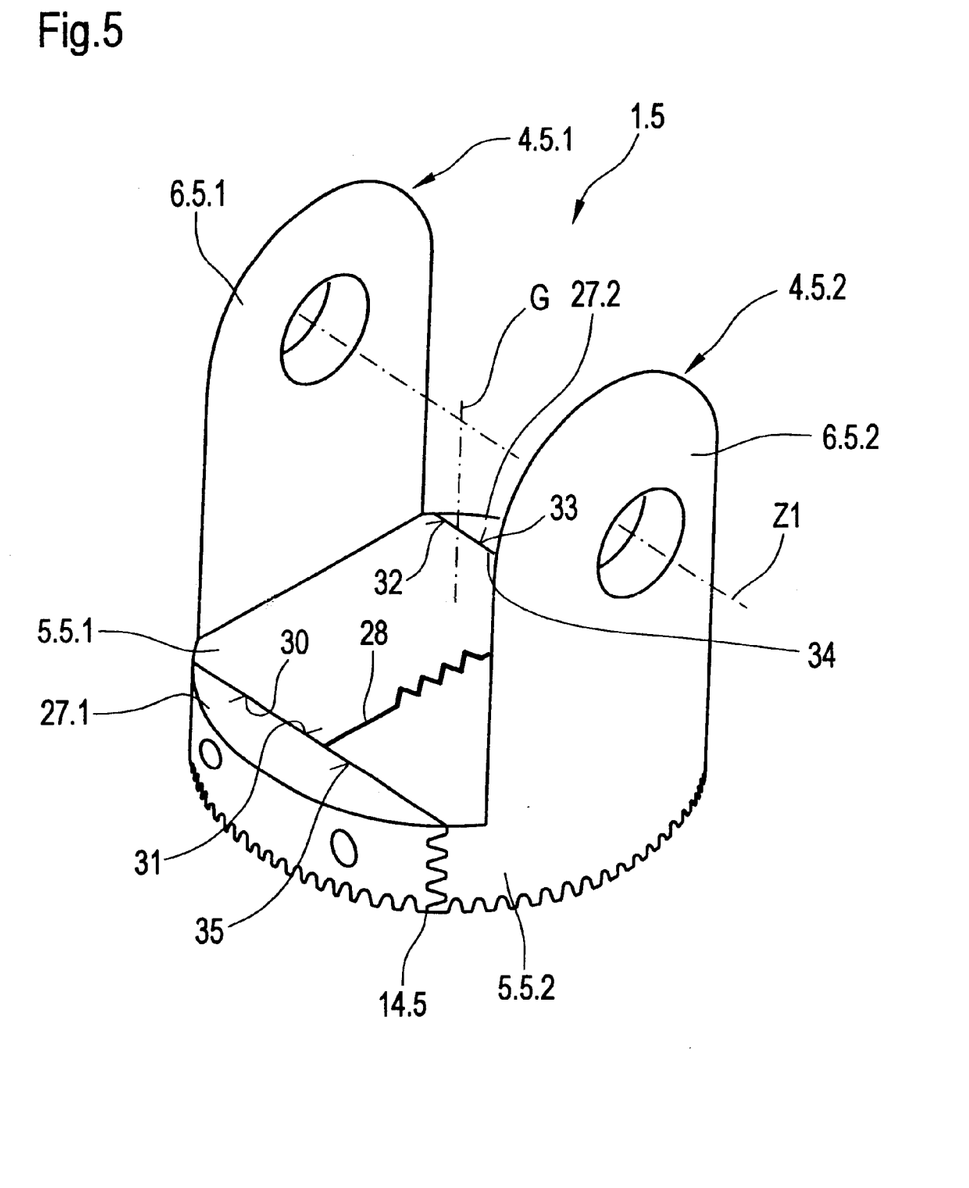
FIG. 5 is a perspective view showing a further embodiment with a flange yoke according to the invention with segmental components.

FIG. 5 shows another way of achieving the object of the invention. Here, a flange yoke 1.5 comprises the two joint fork halves 4.5.1 and 4.5.2 and two segments 27.1 and 27.2, which together with the two joint fork halves form the flange yoke 1.5.

The flange yoke 1.5 can be cast as a one-piece component. It is possible here too for the cast shape to be matched to the subsequently desired shape of the flange yoke, and especially of the base component. Two segments 27.1 and 27.2 are thereafter separated from the flange yoke 1.5. The two joint fork halves 4.5.1 and 4.5.2 are then separated at the joint 28. Mutually complementary component sets of toothing 20.5.1, 20.5.2 of the second set of toothing 20.5 are then machined into the coupling faces 9.5.1 and 9.5.2 formed at the joint 28.

The segments 27.1 and 27.2 are cut off the base component of the one-piece flange yoke in such a way that the two bearing components 6.5.1 and 6.5.2 are unaffected. The parting faces 30, 31 and 32, 33 are thus formed at respective joints 29.1 and 29.2 between the individual segments 27.1 and 27.2 and the two joint fork halves 4.5.1 and 4.5.2. Parting faces 30 and 33 are formed by the joint fork halves 4.5.1 and 4.5.2, while parting face 31 is formed by segment 27.1 and parting face 32 is formed by segment 27.2. The faces formed by the segments are also referred to as outer faces of the segments. Mutually complementary first sets of toothing 34 and 35 are provided on the parting faces, contributing to the achievement of a form-locking connection between the segments 27.1, 27.2 and the individual joint fork halves 4.5.1, 4.5.2. The segments 27.1, 27.2 are additionally connected to the joint fork halves 4.5.1, 4.5.2 by screwed joints. For clarity, only the arrangement of the holes provided for the screwed joint is illustrated here. The screwed joints serve merely to facilitate the production of the flange yoke, in particular the production of the end serrations 14.5 on the underside 12.5 of the flange yoke 1.5. For this purpose, the two joint fork halves 4.5.1 and 4.5.2 are connected in a form-locking manner to the two segments 27.1 and 27.2 by means of the sets of toothing 34 and 35 respectively and additionally by means of the screwed joints. The end serrations 14.5 are then machined in on the underside 12.5 of this composite flange yoke 1.5.

The flange yoke 1.5 is preferably constructed from components that are embodied symmetrically with respect to one another, i.e. the two segmental components 27.1 and 27.2 and joint fork halves 4.5.1 and 4.5.2 are each interchangeable. Segmental component 27.1 can also be employed in place of segmental component 27.2, for example.

The segmental components 27.1 and 27.2 are connected to the joint fork halves 4.5.1 and 4.5.2 by means of screwed joints that are not shown specifically here.

Although the present invention has been described in relation to particular embodiments thereof, many other variations and modifications and other uses will become apparent to those skilled in the art. It is preferred, therefore, that the present invention be limited to not by the specific disclosure herein, but only by the appended claims.

What is claimed is:

1. A flange yoke for a universal joint, the yoke comprising:
   a first and a second joint fork half which are joined to form the flange yoke; a joint fork axis for the fork halves; each joint fork half having an element for receiving a pin and the element has a pin axis;
   each joint fork half comprising a base component and a bearing component;
   the base components of the first and the second joint fork halves being so shaped that they may be form lock connected to form a flange; each base component having an outer circumference, having a coupling face which is applied to the coupling face of the other base component and having a region of the coupling face that is toward the outer circumference;
   mutually complementary first toothing on the coupling face in the region of the outer circumference of each of the base components; the first toothing extending in a direction for having a first tooth trace that forms a first angle to a plane formed by the pin axis and the joint fork axis;
   mutually complementary second toothing generally in the region of the joint fork axis, on the coupling faces of the base components and inward of the region of the outer circumference of each of the base components; the second toothing extending in a direction for having a second tooth trace that extends at a second angle that is across the direction of extension of the first tooth trace.

2. The flange yoke of claim 1, wherein the yoke has an axis of rotation and the joint fork axis coincides with the axis of rotation.

3. The flange yoke of claim 1, wherein the first toothing is curved on the respective coupling face and the respective tooth trace of the first toothing is an extension of the secant through the end points of the curved first toothing.

4. The flange yoke of claim 1, wherein the second toothing is curved on the respective coupling face and the respective tooth trace of the second toothing is an extension of the secant through the end points of the curved second toothing.

5. The flange yoke of claim 1, wherein the respective coupling face of each joint fork half is within a respective plane.

6. The flange yoke of claim 1, wherein the respective coupling face of each joint fork half is in a plurality of different planes.

7. The flange yoke of claim 6, wherein the respective coupling faces of the yoke halves are shaped complementary such that when the coupling faces are brought into engagement, the faces are in contact and the respective planes thereof are complementary.

8. The flange yoke of claim 1, wherein the extension of the first tooth trace extends perpendicular to a plane formed by the pin axis of the joint halves and the joint fork axis.

9. The flange yoke of claim 1, wherein the extension of the second tooth trace extends parallel to the yoke axis.

10. In combination the flange yoke of claim 1 and a connection element for having torque thereto transmitted, wherein
    the flange has a bottom side that faces away from the bearing component, the bottom side has first connection means thereon;
    complementary second connection means on the connection element for coupling to the first connection means, the second connection means providing torque transmission to the connection element, and centering the connection element and the flange yoke and avoiding relative movement in a plane in the coupling between the flange yoke and the connection element, and the connection means are aligned perpendicular to the plane formed by the pin axis and the joint fork axis.

11. The combination of claim 10, wherein the first connection means comprise at least one axially aligned and radially extending set of end serrations formed around a circumference of the bottom side of the flange that faces away from the bearing component.

12. The flange yoke of claim 1, wherein each of the coupling faces of the yoke halves has an area free from toothing between the second toothing and the first toothing.

13. The flange yoke of claim 1, wherein the second toothing on each joint fork half comprises two component sets of toothing, each of which is at a distance spaced from the joint fork axis when projected onto the coupling face.

14. The flange yoke of claim 1, wherein the second toothing comprises straight spur toothing.

15. A flange yoke for a universal joint, the yoke comprising:
    a first and a second joint half which are joined to form the flange yoke;
    each joint fork half comprising a base component and a bearing component;
    the bearing component of each of the fork halves including an element therein for receiving a pin and that the element having a pin axis;
    the base components being so shaped and the fork halves being so shaped that the fork halves may be form lock connected in the region of their base components, each of the base components having a respective coupling face which engages the respective coupling face of the other base component to form a flange from the base components as the coupling faces engage, and the coupling faces being inclined relative to the pin axis supported in the flange yoke;
    at least one segment shaped component positioned next to both of the base components of the two joint fork halves and defining the flange together with the base components; the segment components having an outer surface;
    the base components having a parting face which is engaged by the outer surface of the segment component; the parting face is arranged at an angle to the end facing away from the bearing component; the parting faces of the base components of both joint fork halves and the outer surface of the segment component having mutually complementary first toothing which are engaged when the segment component is against the base components of the yoke halves; the first toothing having a first direction of extension providing a first tooth trace; when projected into a common plane with the joint fork axis, the extension of the first tooth trace extends at a first angle to the joint fork axis;

second toothing formed in the region of the joint fork axis and on the facing coupling faces of the base components, so that when the fork halves are engaged at their coupling faces, the second toothing are mating; the second toothing, having a second direction of extension providing a second tooth trace; the extension of the second tooth trace is at a second angle across the first tooth trace.

16. The flange yoke of claim 15, wherein the first toothing is curved on the respective coupling face and the first tooth trace is an extension of a secant through the end points of the curved first toothing.

17. The flange yoke of claim 16, wherein the second toothing is curved on the respective coupling face and the second tooth trace is an extension of a secant through the end points of the second toothing.

18. In combination, the flange yoke of claim 15 and a connection element for having torque thereto transmitted, wherein the flange has a side that faces away from the bearing component and the flange side has means thereon for coupling to complementary means on the connection element for torque transmission to the connection element and for centering on the connection element and on the flange yoke for avoiding relative movement in a plane that lies in the coupling zone between the flange yoke and the connection element and is aligned perpendicular to the plane formed by the pin axis and the joint fork axis.

19. The combination of claim 18, wherein the means for torque transmission comprise at least one axially aligned, radially extending set of end serrations formed at the circumference of the flange side that faces away from the bearing component.

20. The combination of claim 19, wherein the extension of the tooth traces of the second set of toothing extends parallel to the joint fork axis.

21. A flange yoke for a universal joint, the yoke comprising:

a first and a second joint fork half which are joined to form the flange yoke; a joint fork axis for the fork halves;

each joint fork half having an element for receiving a pin and the element has a pin axis;

each joint fork half comprising a base component and a bearing component;

the base components of the first and the second joint fork halves being so shaped that they may be form lock connected, to form a flange; each base component having an outer circumference, having a region at the outer circumference, and having a coupling face which is applied to the coupling face of the other base component;

mutually complementary first toothing on the coupling face in the region of the outer circumference of each of the base components; the first toothing extending in a direction for having a first tooth trace that forms a first angle to a plane formed by the pin axis and the joint fork axis;

mutually complementary second toothing generally in the region of the joint fork axis inward of the outer circumference of each of the base components and on the coupling faces of the base components; the second toothing extending in a direction for having a second tooth trace that extends at an angle perpendicular to the direction of extension of the first tooth trace.

22. A flange yoke for a universal joint, the yoke comprising:

a first and a second joint half which are joined together to form the flange yoke;

each joint fork half comprising a base component and a bearing component; the bearing component of each of the fork halves including an element therein for receiving a pin and that the element having a pin axis;

the base components being so shaped and the fork halves being so shaped that the fork halves may be form lock connected in the region of their base components, each of the base components having a respective coupling face which engages the respective coupling face of the other base component to form a flange from the base components as the coupling faces engage, and the coupling faces being inclined relative to the pin axis supported in the flange yoke;

at least one segment shaped component positioned next to both of the base components of the two joint fork halves and defining the flange together with the base components; the segment components having an outer surface;

the base components having a parting face which is engaged by the outer surface of the segment component; the parting face is arranged at an angle to the end facing away from the bearing component; the parting faces of the base components of both joint fork halves and the outer surface of the segment component having mutually complementary first toothing which are engaged when the segment component is against the base components of the yoke halves; the first toothing having a first direction of extension providing a first tooth trace; when projected into a common plane with the joint fork axis, the extension of the first tooth trace extends at a first angle to the joint fork axis;

second toothing formed in the region of the joint fork axis and on the facing coupling faces of the base components, so that when the fork halves are engaged at their coupling faces, the second toothing are mating; the second toothing, having a second direction of extension providing a second tooth trace; the extension of the second tooth trace is at an angle perpendicular to the first tooth trace.

* * * * *